(12) United States Patent
Fukumoto

(10) Patent No.: US 10,324,444 B2
(45) Date of Patent: Jun. 18, 2019

(54) NUMERICAL CONTROLLER INCLUDING TOOL RETRACTING FUNCTION FOR AVOIDANCE OF INTERFERENCE

(71) Applicant: FANUC CORPORATION, Minamitsuru-gun, Yamanashi (JP)

(72) Inventor: Akinobu Fukumoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 118 days.

(21) Appl. No.: 15/678,419

(22) Filed: Aug. 16, 2017

(65) Prior Publication Data

US 2018/0059636 A1      Mar. 1, 2018

(30) Foreign Application Priority Data

Aug. 31, 2016   (JP) .................................. 2016-169323

(51) Int. Cl.
  *G06F 19/00*     (2018.01)
  *G05B 19/19*     (2006.01)
(52) U.S. Cl.
  CPC .... *G05B 19/19* (2013.01); *G05B 2219/49157* (2013.01); *G05B 2219/50108* (2013.01); *G05B 2219/50112* (2013.01)
(58) Field of Classification Search
  CPC .......... G05B 19/19; G05B 2219/50108; G05B 2219/49157; G05B 2219/50112
  See application file for complete search history.

(56) References Cited

U.S. PATENT DOCUMENTS

| 4,513,366 | A | * | 4/1985 | Munekata | .......... | G05B 19/4061 318/563 |
| 5,060,544 | A | * | 10/1991 | Hanaki | ............... | G05B 19/406 82/1.11 |
| 5,339,015 | A | * | 8/1994 | Hanaki | .............. | G05B 19/4061 318/565 |
| 6,591,148 | B1 | * | 7/2003 | Masuda | ............... | G05B 19/184 409/274 |

(Continued)

FOREIGN PATENT DOCUMENTS

| JP | H03167606 A | 7/1991 |
| JP | 2007-188170 A | 7/2007 |

OTHER PUBLICATIONS

Notification of Reasons for Refusal for Japanese Application No. 2016-169323, dated Nov. 27, 2018, with translation, 5 pages.

*Primary Examiner* — Michael D Masinick
(74) *Attorney, Agent, or Firm* — RatnerPrestia

(57) ABSTRACT

Executable format data resulting from decoding of a positioning block (retraction block) prior to start of cutting and an end point coordinate position P1 for command for the retraction block are stored. When machining is interrupted and a request for retraction of a tool is input, a retracting operation 1 is performed to retract the tool from a machining interruption position P2 to the stored end point coordinate position P1 of the retraction block. Subsequently, the stored executable format data of the retraction block is executed, with a moving direction for the executable format data being reversed to move the tool. The tool performs a retracting operation 2 of moving in the opposite direction along a moving path for in the retraction block. The retracting operations 1, 2 allow the tool to be retracted while avoiding interfering with other members.

8 Claims, 11 Drawing Sheets

(56) References Cited

U.S. PATENT DOCUMENTS

| | | | | |
|---|---|---|---|---|
| 8,573,097 B2* | 11/2013 | Dixon | ............... | G05B 19/4065 |
| | | | | 700/174 |
| 9,864,359 B2* | 1/2018 | Yamashita | ......... | G05B 19/4155 |
| 2016/0147213 A1* | 5/2016 | Murakami | ............. | G05B 19/19 |
| | | | | 700/188 |

* cited by examiner

NUMERICAL CONTROLLER INCLUDING TOOL RETRACTING FUNCTION FOR AVOIDANCE OF INTERFERENCE

BACKGROUND OF THE INVENTION

1. Field of the Invention

The present invention relates to a numerical controller that controls a machine tool, and in particular, to a numerical controller including a function to retract a tool during machining so as to avoid interfering with other members.

2. Description of the Related Art

In a numerically controlled machine tool, when, during machining based on execution of a machining program, the machining is interrupted for any reason or cause, a tool needs to be retracted to a position that is safe for operations in order to determine the reason or cause of the interruption and to take restoration measures. In this retracting operation, the tool needs to be retracted so as to avoid mutual interference of the tool and a machining target workpiece during the retracting operation.

For example, as depicted in FIG. 12, while a hole 3 is being formed in a workpiece W, this machining may be interrupted and a tool 1 attached to a main spindle 2 may be retracted. In this case, simple retraction of the tool 1 in only one direction may cause the tool 1 and the workpiece W to interfere with each other, leading to possible damage to the workpiece W or the tool 1. Thus, a method is needed to retract the tool 1 while avoiding possible interference.

Japanese Patent Application Laid-open No. 2007-188170 describes a method for retracting a tool while avoiding possible interference. In the method, with a machining program executed, a tool retraction program is constantly calculated and saved that involves a direction opposite to a direction involved in the executed program. When the machining is interrupted, the tool is moved a given distance in a direction perpendicular to a tool moving vector obtained at that point in time. Then, the hitherto saved tool retraction program is executed to move the tool in a direction opposite to the direction of a machining path to retract the tool to a reference position. Thus, the tool is retracted while avoiding interfering with the workpiece.

In numerically controlled machine tools, when, during machining, need arises to interrupt the machining and retract the tool, the tool needs to be retracted so as to avoid interfere with other members.

In the method described in Japanese Patent Application Laid-open No. 2007-188170, the tool retraction program needs to be constantly calculated and saved that involves the moving direction opposite to the moving direction involved in the executed machining program. This leads to the need for storage means in which the tool retraction program is stored and saved, and the needed capacity of the storage means increases consistently with the size of the NC machining program. If the storage means has an insufficient storage area, the tool retraction program fails to be stored, disadvantageously precluding retraction to a desired position.

Furthermore, depending on the contents of the machining program, the movement in the opposite direction along the machining path for machining (execution of the machining program in the opposite direction) is not always appropriate. For example, in machining of a threaded hole, a rotating position (phase) and a feed position of the tool for which the machining has been stopped are precluded from being accurately determined. Thus, a machined threaded portion may be damaged when the machining program is executed in the opposite direction to perform the movement in the opposite direction along the machining path.

Additionally, the interference may fail to be avoided by the method of moving the tool the given distance in the direction perpendicular to the tool moving vector and then moving the tool in the direction opposite to the direction of the machining path to retract the tool to the reference position as described in Japanese Patent Application Laid-open No. 2007-188170.

For example, when boring is executed using a machining path L indicated in the machining program, machining may be stopped at a point Q1 before completion and a tool 1 may be retracted as depicted in FIG. 13. In this case, when the tool 1 is moved and shifted a given distance in a direction perpendicular to a tool moving vector (point Q1') and moved along a path RL for a retracting operation of moving the tool using a tool retraction program involving a moving direction opposite to a moving direction in the machining program as described in Japanese Patent Application Laid-open No. 2007-188170, the tool 1 interferes with the workpiece W at a point Q2. This disadvantageously precludes the tool from being retracted while avoiding interference.

SUMMARY OF THE INVENTION

An object of the present invention is to provide a numerical controller including a tool retracting function to facilitate retraction of a tool during machining without causing interference.

A numerical controller according to the present invention controls a machine tool and includes: a retraction block determination condition setting unit configured to set a condition for selecting as a retraction block a block in a machining program that moves a tool in an opposite direction along a command movement path when machining is suspended during machining operation and the tool is retracted; a determination unit configured to determine, when the machining is executed to perform the machining program, whether or not a decoded block in the machining program is the retraction block that satisfies the condition set by the retraction block determination condition setting unit; an executable format data reading unit configured to read executable format data resulting from decoding of the block determined to be the retraction block by the determination unit; an end point coordinate position reading unit configured to read an end point coordinate position indicated in the block determined to be the retraction block by the determination unit; a memory unit configured to store the read executable format data and the endpoint coordinate position; and a tool retracting unit configured to move, when a tool retraction command is input, the tool from a current tool position to the end point coordinate position of the retraction block stored in the memory unit, then to reverse a moving direction for the executable format data of the retraction block stored in the memory, and to execute the executable format data in order to retract the tool.

The memory unit may be able to store the executable format data and the end point coordinate position for a plurality of retraction blocks. The tool retracting unit may be configured to read retraction block information stored in the memory unit in a reverse order to an order of storage, to move the tool from a tool position assumed when the tool retraction command is input to the end point coordinate position of the read retraction block, and to reverse the moving direction for the executable format data of the retraction block to execute the executable format data, then to move the tool to the end point coordinate position for the read retraction block, and then to reverse the moving direction for the executable format data of the retraction block to repeat execution of the executable format data until the executable format data of the last read retraction block is executed with the moving direction for the executable format data reversed, thus retracting the tool.

The retraction block determination condition setting unit may set a sequence number or a line number of a block in the machining program to be selected as the retraction block, and the determination unit may determine whether or not a block is the retraction block, based on the set sequence number or the line number in the machining program.

The retraction block determination condition setting unit may set, as selection conditions for the retraction block, a plurality of pieces of information that are included in information of each block of the machining program and that allow the block to be designated as the retraction block. The determination unit may determine whether or not the information of the decoded block satisfy all the set selection conditions thereby determining whether or not the block is the retraction block. The selection conditions may include at least a positioning command and an axis targeted by the positioning command and a moving distance thereof.

The retraction block may be designated by, instead of using the retraction block determination condition setting unit, adding a predefined code to a block in the machining program, and the determination unit may determine the block, to which the predefined code has been added, to be the retraction block.

The retraction block determination condition setting unit may set, as a condition for selection as the retraction block, a nearest block for the positioning command before a tool diameter compensation command, a block for the positioning command after the tool diameter compensation command, or a block for the positioning command immediately before a block with a machining mode switching code as represented by a composite fixed cycle command, and the determination unit may determine whether or not a block is a retraction block by determining whether or not the information of the decoded block satisfy the condition set by the retraction block determination condition setting unit.

The determination unit may include a plurality of methods for determining and selecting a retraction block. The retraction block determination condition setting unit may set the method for determining and selecting a retraction block and determination conditions. The determination unit may determine whether or not the block is a retraction block, based on the method selected and set by the retraction block determination condition setting unit.

The present invention allows the tool to be easily retracted while avoiding interfering with other members when the tool needs to be retracted during machining and allows a retracting operation to be performed without causing interference even in a machining program including a portion for which retracting the tool in the opposite direction along the machining path is disadvantageous. Furthermore, the tool can be reliably retracted to the desired position even in a machining program with a large number of blocks.

BRIEF DESCRIPTION OF THE DRAWINGS

FIG. 5 is a flowchart illustrating an algorithm of a retraction block determination process in an embodiment of the present invention that is executed when the retraction block is designated using a sequence number or the like;

DETAILED DESCRIPTION OF THE PREFERRED EMBODIMENTS

In the present invention, a block (a command unit in a machining program) is preset for which a command position (in general, a position before start of cutting) is a position where a tool is suitably retracted safely (without causing interference). When machining is interrupted before completion and the tool is retracted, the tool is moved from a machining interrupted position to a preset end point coordinate position of the block with a path in the machining program neglected. Subsequently, the tool is moved in an opposite direction along the path of the indicated block (retraction block) so as to be retracted while avoiding interfering with other members.

Figure 1:
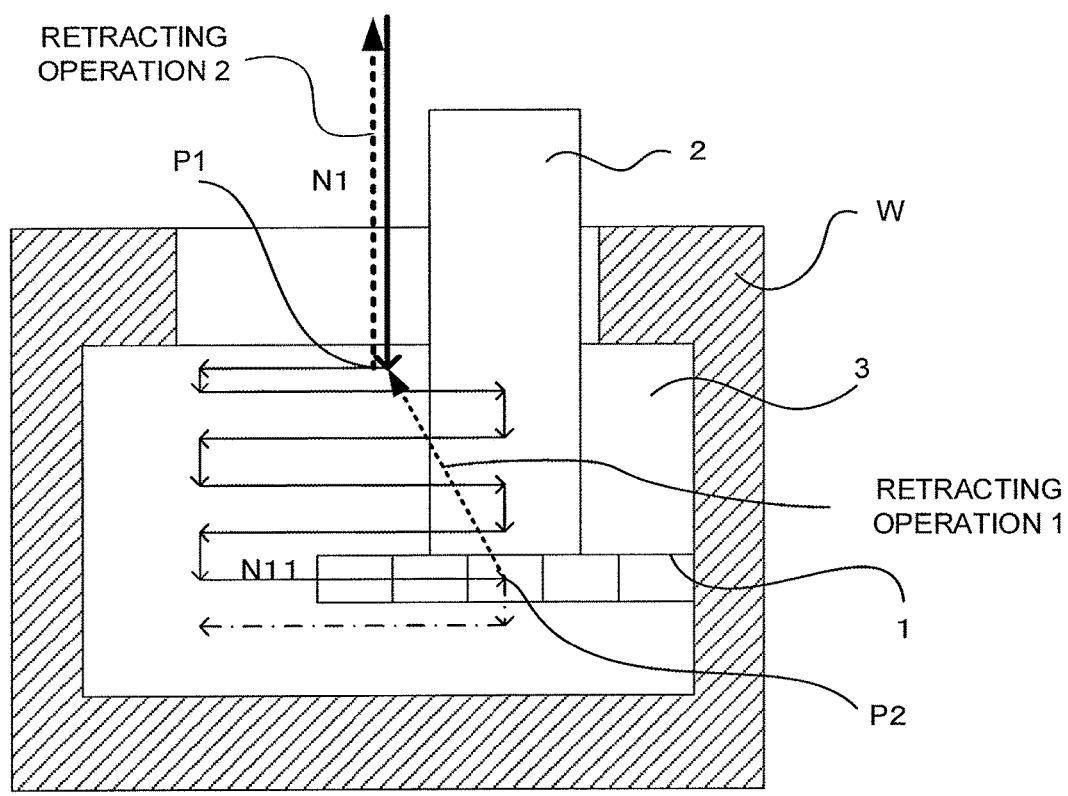
FIG. 1 is a diagram illustrating an operating principle of the present invention taking boring as an example.

FIG. 1 is a diagram illustrating an operating principle of the present invention taking boring as an example. A path depicted by a continuous arrow illustrates a tool path indicated in the machining program. A path depicted by a dashed arrow represents a path through which the tool is retracted.

In this example of machining, in a block N1 in the machining program, a tool 1 is moved to a point P1 through a positioning operation, a workpiece W is subsequently cut while a cutting operation and a feeding operation are being performed. In the present invention, the retraction block is set to be the block N1 in the machining program for which the command position is the position where the tool 1 is suitably retracted. However, the block N1 for a positioning command is a block for a command to move the tool 1 without cutting, and thus, after being successfully moved to the end point coordinate position P1 of the block, the tool can be safely retracted. The positioning block N1 is set as a retraction block, and executable format data resulting from decoding of the block and the end point coordinate position (P1) are stored.

During the subsequent cutting, when need arises to stop the machining and retract the tool 1, for example, when, during execution of a command in a block N11, the machining is interrupted at a position P2 and the tool 1 is retracted, the tool 1 is moved from the position P2 corresponding to the interruption of the machining to the end point coordinate position P1 of the retraction block N1 (movement depicted by the dashed line in FIG. 1 and hereinafter referred to as a retracting operation 1) and then moved with the moving direction reversed based on the set and stored executable format data of the retraction block N1 (movement depicted by the dashed line in FIG. 1 and hereinafter referred to as a retracting operation 2).

The above-described retracting operation is performed to allow the tool 1 to be safely retracted.

Figure 2:
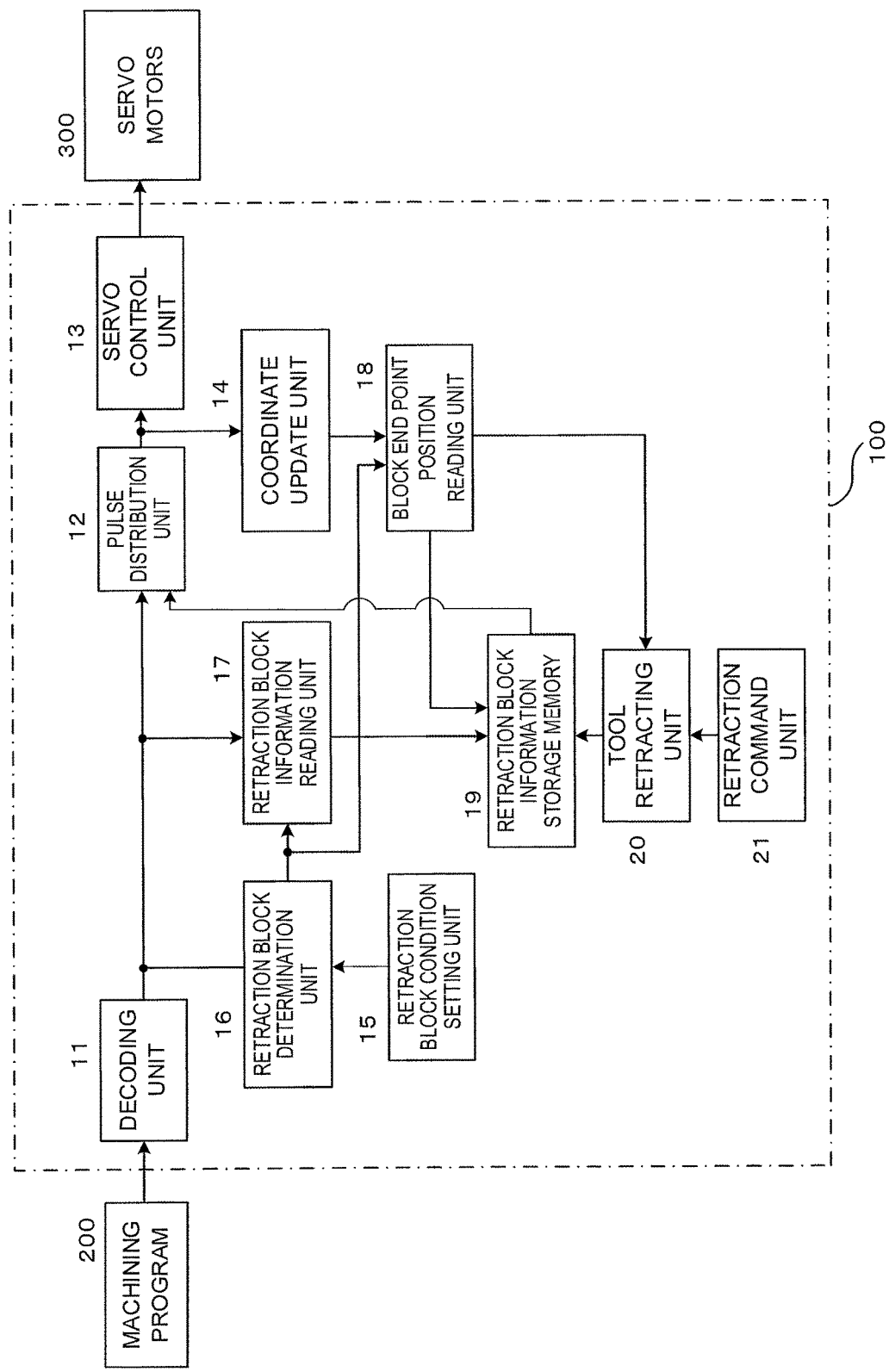
FIG. 2 is a functional block diagram of a numerical controller in an embodiment of the present invention.

FIG. 2 is a functional block diagram of a numerical controller in an embodiment of the present invention; A numerical controller is denoted by reference numeral 100, a machining program is denoted by reference numeral 200. A servo motor that drives each feed axis of a machine tool is denoted by reference numeral 300. Components such as a main spindle motor and control means for the main spindle motor are omitted which are not directly related to the present invention.

The numerical controller 100 includes a decoding unit 11, a pulse distribution unit 12, a servo control unit 13, and a coordinate update unit 14 as is the case with the related art. The decoding unit 11 sequentially reads commands from blocks in the machining program 200, decodes and converts the commands into executable format data, and stores the executable format data in a register. The decoding unit 11 pre-loads a plurality of blocks succeeding the current block before the command of the current block is executed, and sequentially stores executable format data of the plurality of read blocks in the register (hereinafter referred to as a look-ahead register). The pulse distribution unit 12 reads, in a first-in and first-out manner, the executable format data stored in the look-ahead register after being obtained as a result of decoding by the decoding unit 11, and distributes pulses to the feed axes based on the data. In accordance with the pulse distribution, the servo control unit 13 controls servo motors for the respective feed axes. The coordinate update unit 14 updates the coordinate position of each of the feed axes (coordinate position of a tool), based on the pulses distributed to the feed axes by the pulse distribution unit 12.

Configurations and effects of the decoding unit 11, the pulse distribution unit 12, the servo control unit 13, and the coordinate update unit 14 are conventionally provided in the numerical controller 100. However, in the present embodiment, the numerical controller 100 further includes a retraction block condition setting unit 15, a retraction block determination unit 16, retraction block information reading unit 17, a block end point position reading unit 18, a retraction block information storage memory 19, a tool retracting unit 20, and a retraction command unit 21. These additional units enable a tool to be retracted while avoiding interfering with other members when the tool needs to be retracted before machining is completed.

In the present invention, conditions for the retraction block are determined, and a block satisfying the conditions is determined to be the retraction block and set as the retraction block. Methods for setting and determining the retraction block include the following methods A to D.

A. A method of setting a sequence number or a position (line number) of a block in the machining program as a retraction block determination condition and setting a block satisfying this setting condition as the retraction block.

B. A method of specifying various conditions that can be specified for the retraction block (for example, a positioning command for a commanded axis (Z axis, an axis perpendicular to a plane), a moving distance for the axis, an end point coordinate value (or a start point coordinate value) for the axis, or the like) and setting a block having all these conditions as the retraction block.

C. A method of designating a block using, in the NC machining program, a code indicating that the block is the retraction block (for example, a G code or an M code) and setting the retraction block under a retraction block determination condition that the code is added to the retraction block.

D. A method of selecting and setting the retraction block under the condition of presence of a particular content in the machining program.

D1. A method of setting a block for a positioning command as the retraction block under the condition that the positioning command is the nearest positioning command for the Z axis (=the axis perpendicular to a plane including a tool diameter compensation direction (hereinafter referred to as a base axis)) before activation of the tool diameter compensation.

D2. A method of setting a block for a positioning command as the retraction block under the condition that the positioning command is a positioning command for the Z axis (=base axis) after the activation of the tool diameter compensation.

D3. A method of setting a block for a positioning command as the retraction block under the condition that the positioning command is a positioning command immediately before a composite fixed cycle command.

To designate a block as the retraction block, besides the methods D1, D3, and D3 described above, a method may be used in which a block for a positioning command immediately before a block with a machining mode switching code for threading or the like is designated as the retraction block.

Figure 3:
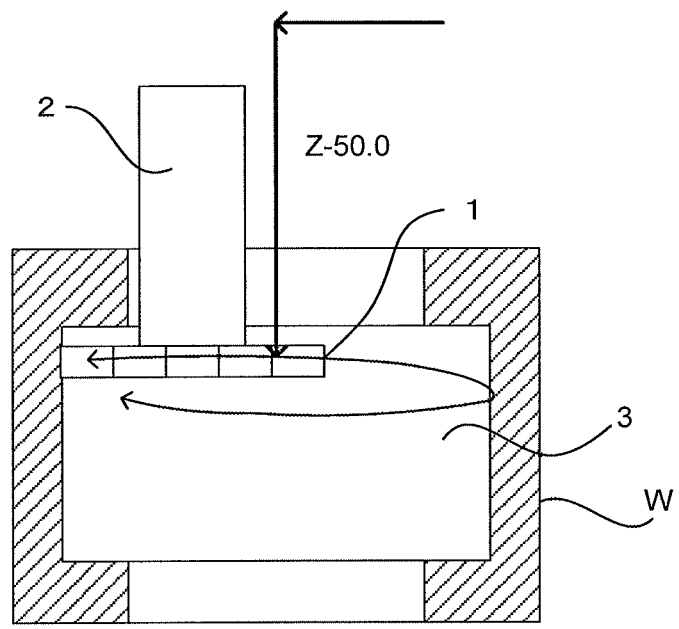
FIG. 3 is a diagram of an example illustrating a relation between a retraction block designated in the present invention and a tool diameter compensation command.

FIG. 3 is a diagram illustrating that the block determined by the method D1, D2 is suitable as the retraction block on which a retracting operation 2 is performed. The block for the positioning command for the base axis before or after the tool diameter compensation can be moved and positioned while avoiding interference of the tool with a workpiece or the like as a result of the command of the block. The block can also be moved without causing interference even when moved in the opposite direction along the same path, and is thus suitable as the block on which the retracting operation 2 is performed.

A machining program in which a hole 3 depicted in FIG. 3 is formed and on which the setting method D1 is effective is represented by the following Machining program example 1.

Machining Program Example 1

G00X0Y0
Z-50.0

G42G01X-30.0D1F1000
G021-30.0
Z-3.0
G021-30.0
. . .
. . .

When the setting method D1 is used to designate the retraction block, a positioning command "Z-50.0" for the Z axis immediately before the block for a tool diameter compensation command "G42" is designated as the retraction block. "G00X0Y0" is a positioning command, "G42" is a command for tool diameter compensation-right, "G01X-30.0" is a linear interpolation command, "D1" is a command indicating a correction number 1 for tool diameter compensation, "F1000" is a command for a feed speed, "G02" is a command for circular arc interpolation in a clockwise direction, and "I-30.0" is a command using an X axis as an I axis and using the I axis-30.0 as the center of the circular arc.

A machining program in which the hole 3 depicted in FIG. 3 is formed and on which the setting method D2 is effective is represented by the following Machining program example 2.

Machining Program Example 2

G42X0Y0D1
G00Z-50.0
G01X-30.0F1000
G021-30.0
Z-3.0
G021-30.0
. . .
. . .

A positioning command "G00Z-50.0" for the Z axis immediately after the tool diameter compensation command "G42" is designated as the retraction block.

Figure 4:
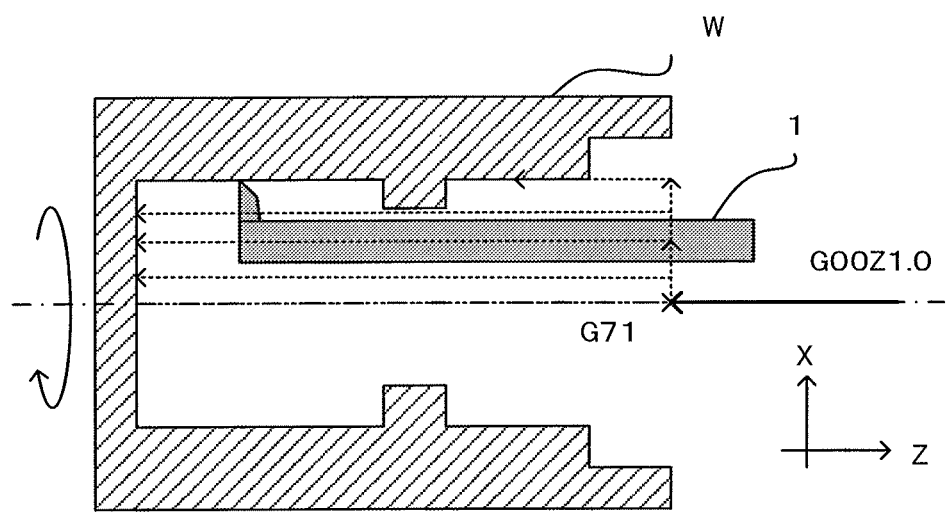
FIG. 4 is a diagram of an example illustrating a relation between the retraction block designated in the present invention and a composite fixed cycle command.

FIG. 4 is a diagram of an example of bore diameter machining using a composite fixed cycle of a lathe system in which machining is executed in accordance with a cycle command after a positioning command for a plane first axis (Z axis). An NC machining program for this machining is represented by the following Machining program example 3.

Machining Program Example 3

G00Z1.0
G71U_R_
G71P1Q9U_W_F_S_T_
N1G00X40.0Z0
N2G01Z-7.0
N3X35.0
. . .
. . .

If the retraction block is set by the setting method D3, then in the NC machining program using the composite fixed cycle, the block for the positioning command "G00Z1.0" issued immediately before the fixed cycle command "G71" is issued is designated as a block allowing the retracting operation 2 to be performed. In a command "G71U_R_", a fixed cycle command is denoted by G71, the depth of cut is denoted by U, and an escape amount is denoted by R. In a command "G71P1Q9U_W_F_S_T_", a fixed cycle command is denoted by G71 and a contour shape is denoted by P1Q9, and this command indicates shapes for sequence numbers N1 to N9. U (X direction) and W (Z axis direction) are codes indicative of finishing allowances, F is a code indicative of feed, S is a code indicative of a main spindle speed, and T is a code indicative of a tool.

In the setting methods A, B, a display apparatus and input means such as a keyboard which are provided in the numerical controller 100 are used as the retraction block condition setting unit 15 to set a condition for determining the retraction block based on parameters and the like for the numerical controller. The setting method C involves providing, in the machining program, a code that designates a block as the retraction block instead of receiving a code indicative of the retraction block from the retraction block condition setting unit 15. Thus, a program for the setting method C stored as the retraction block determination unit may be pre-configured to select, as the retraction block, a block with a code indicative of the retraction block. Also in the retraction block setting methods D1 to D3, the retraction block determination unit 16 may determine the retraction block by determining whether the setting conditions D1 to D3 are met. Consequently, the retraction block condition setting unit 15 need not especially be provided.

However, in the present embodiment, any of the setting methods A to D for the retraction block may be selected depending on various machining programs. The retraction block condition setting unit 15 including the display apparatus and the input means such as the keyboard may be used to select one of the setting methods A to D to set the retraction block.

The retraction block determination unit 16 uses the setting method set by the retraction block condition setting unit 15 to determine whether or not the block loaded by the decoding unit 11 satisfies the setting condition:
  when the setting method A is set, the retraction block is identified based on the sequence number or the position (line number) in the program;
  when the setting method B is effectively set, whether or not a block is the retraction block is determined depending on whether or not block information data output from the decoding unit 11 satisfies the setting conditions set for the setting method B;
  when the setting method C is effectively set, whether or not a block is the retraction block is determined depending on whether or not a code (a G code or an M code) is present that designates the retraction block based on the block information data output from the decoding unit 11; and
  when the setting method D is effectively set, the retraction block is determined based on a combination of a block for the tool diameter compensation command and a block for the positioning command for the base axis or a combination of a block for the composite fixed cycle command and a block for the positioning command.

When the retraction block determination unit 16 determines the retraction block, the retraction block information reading unit 17 reads the executable format data of the block resulting from decoding by the decoding unit 11 to store the executable format data in the retraction block information storage memory 19. When the retraction block determination unit 16 determines the retraction block, the block endpoint position reading unit 18 reads the coordinate position from the coordinate update unit 14 to store the coordinate position of the retraction block information storage memory 19. As a result, the retraction block information storage memory 19 stores the executable format data of the retraction block and the end point coordinate position of the retraction block.

When a retraction command is input via the retraction command unit 21 including an operation panel, soft keys, and manual input means of the numerical controller 100, the tool retracting unit 20 reads the executable format data and the end point coordinate position stored in the retraction block information storage memory 19, and outputs a command to move the tool from a coordinate position corresponding to interruption of machining to the read end point coordinate position of the retraction block, to the pulse distribution unit 12 to allow a "retracting operation 1" to be performed. Subsequently, the moving direction for the read executable format data is reversed and the resultant executable format data is output to the pulse distribution unit 12 to allow a "retracting operation 2" to be performed.

Figure 5:
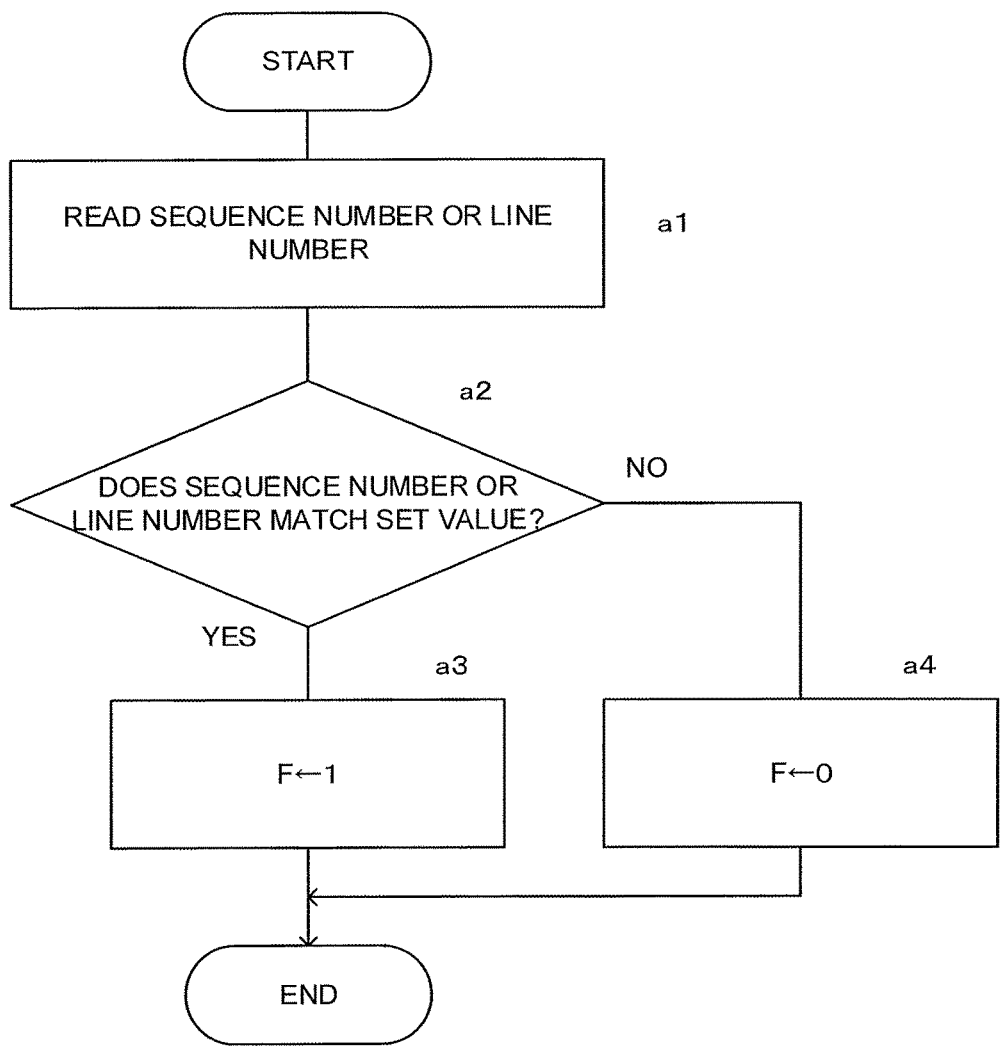

FIG. 5 is a flowchart of an algorithm of a retraction block determination process executed by a processor in the numerical controller 100 serving as the retraction block determination unit 16 when the retraction block condition setting unit 15 has input and set the determination method A for the retraction block and also input and set the sequence number or the line number of the block as a determination condition for the determination method. The processor executes processing illustrated in FIG. 5 each time one block is read from the machining program.

First, the processor reads the sequence number of the current block or the line number of the block (step a1), determines whether the read sequence number or the line number of the block matches the set sequence number or the set line number of the block (step a2), and if the numbers match each other, sets, to "1", a flag F that is indicative of the retraction block provided along with the executable format data resulting from decoding of the corresponding block by the decoding unit 11 and stored in the look-ahead register (step a3). On the other hand, if the sequence number or the line number of the block does not match the set sequence number or the set line number of the block, the flag F is set to "0" (step a4) to end the retraction determination process executed to decode the block. Thus, along with the executable format data of the block determined to be the retraction block, the data for the flag F=1 is stored in the register.

Figure 6:
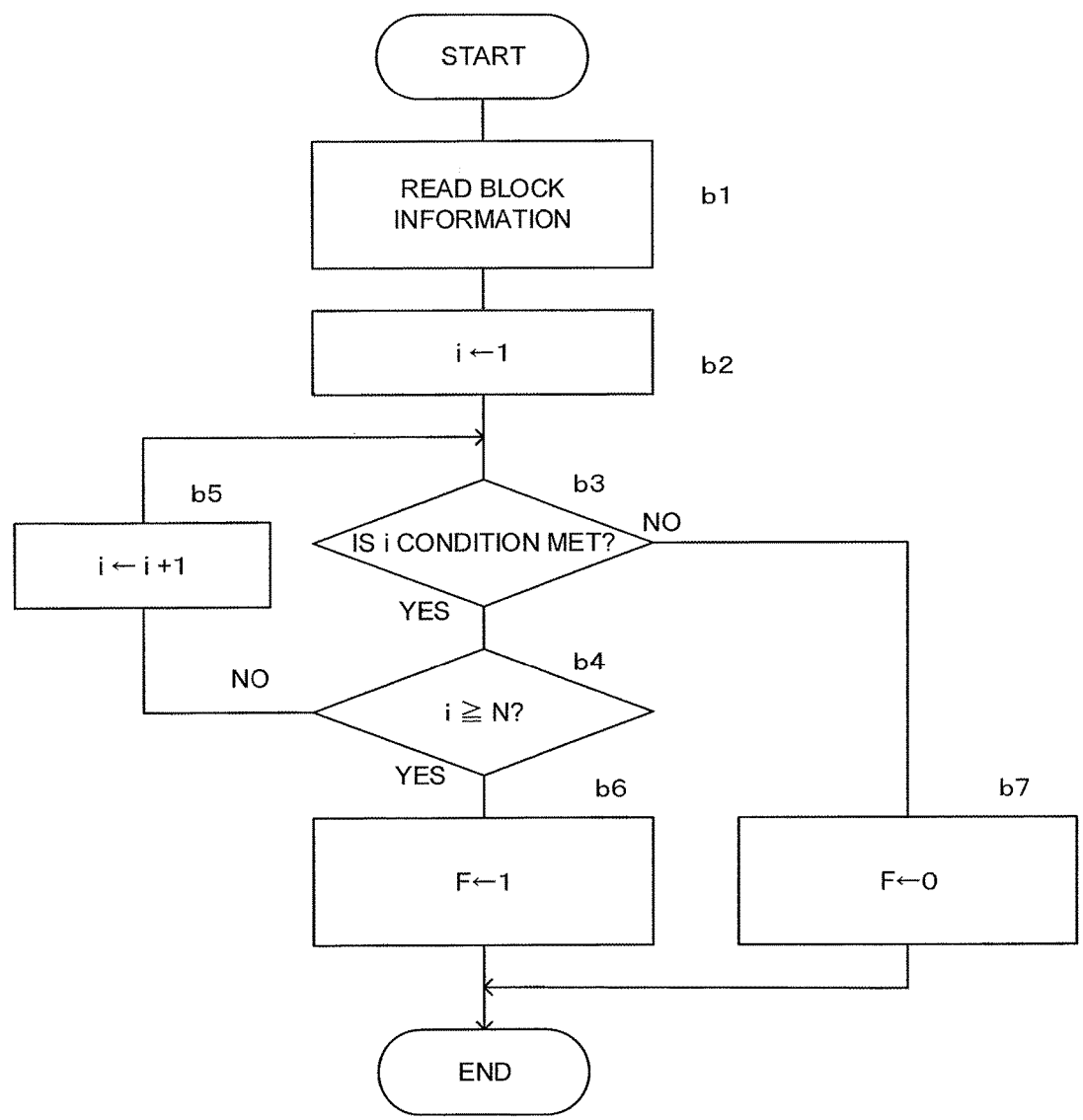
FIG. 6 is a flowchart illustrating an algorithm of a retraction block determination process in an embodiment of the present invention that is executed when the retraction block is selected under various conditions.

FIG. 6 is a flowchart of an algorithm of a retraction block determination process executed by the processor in the numerical controller 100 serving as the retraction block determination unit 16 when the retraction block condition setting unit 15 has input and set the determination method B for the retraction block and input and set various conditions (a positioning command for a predetermined axis, a moving direction, a moving distance, an end point coordinate value, and the like) as determination conditions for the determination method B. The processor executes processing illustrated in FIG. 6 each time the decoding unit 11 reads one block from the machining program.

First, the processor reads block information resulting from decoding by the decoding unit 11 (step b1), sets, to "1", an indicator i that is indicative of a condition set to allow the retraction block to be determined (step b2), determines whether or not the read block information satisfies the ith setting condition (step b3), and if the setting condition is met, determines whether or not the indicator i is equal to or larger than the number of the set conditions (step b4), and if the indicator i has not reached the number N of the conditions, increments the indicator i by one (step b5) and returns to step b3. The processor subsequently repeatedly executes the processing in steps b3 to b5, and if the indicator i has reached the number N of the setting conditions and all of the set determination conditions for the retraction block have been met (determination of YES in step b4), sets, to "1", the flag F that is indicative of the retraction block and that is provided in the executable format data stored in the look-ahead register (step b6). On the other hand, while repeatedly executing the processing in steps b3 to b5, the processor shifts from step b3 to step b7 to set the flag F to "0" (step b7) if at least one of the determination conditions does not match the corresponding set condition and is not met (determination of NO in step B3). Thus, the flag F that is indicative of the retraction block along with the executable format data of each block is set to "1" if the block is the retraction block or to "0" if the block is not the retraction block. Then, the retraction block determination process for the current block is ended.

Figure 7:
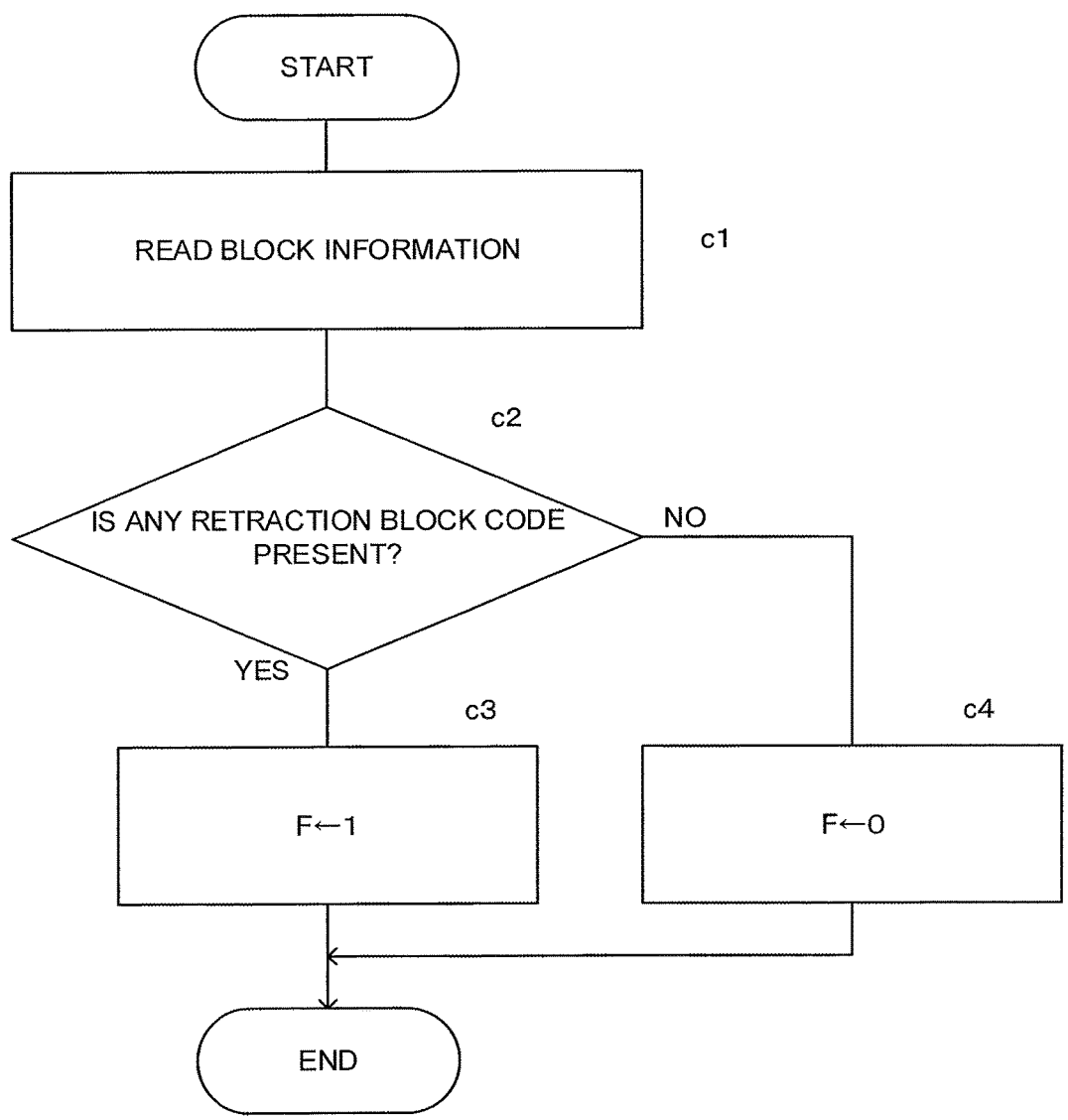
FIG. 7 is a flowchart illustrating an algorithm of a retraction block determination process in an embodiment of the present invention that is executed when the machining program is provided with a code indicative of the retraction block.

FIG. 7 is a flowchart of an algorithm of a retraction block determination process executed by the processor in the numerical controller 100 serving as the retraction block determination unit 16 when the retraction block condition setting unit 15 has input and set, as the determination condition, the determination method C for the retraction block and set the code (the G code or the M code) that is indicative of the retraction block (when this determination method is adopted, the code that is indicative of the retraction block (the G code or the M code) is set in the block in the machining program that is selected as the retraction block). The processor executes processing illustrated in FIG. 7 each time one block is read from the machining program.

The processor reads block information resulting from decoding by the decoding unit 11 (step c1), and determines whether or not the read block information contains the code (the G code or the M code) that designates the set retraction block (step c2). If the block information contains the code, the processor sets, to "1", the flag F that is indicative of the retraction block to be stored along with the executable format data (step c3). If the block information does not contain the code, the processor sets the flag F to "0" (step c4) to end the retraction block determination process for the current block.

Figure 8:
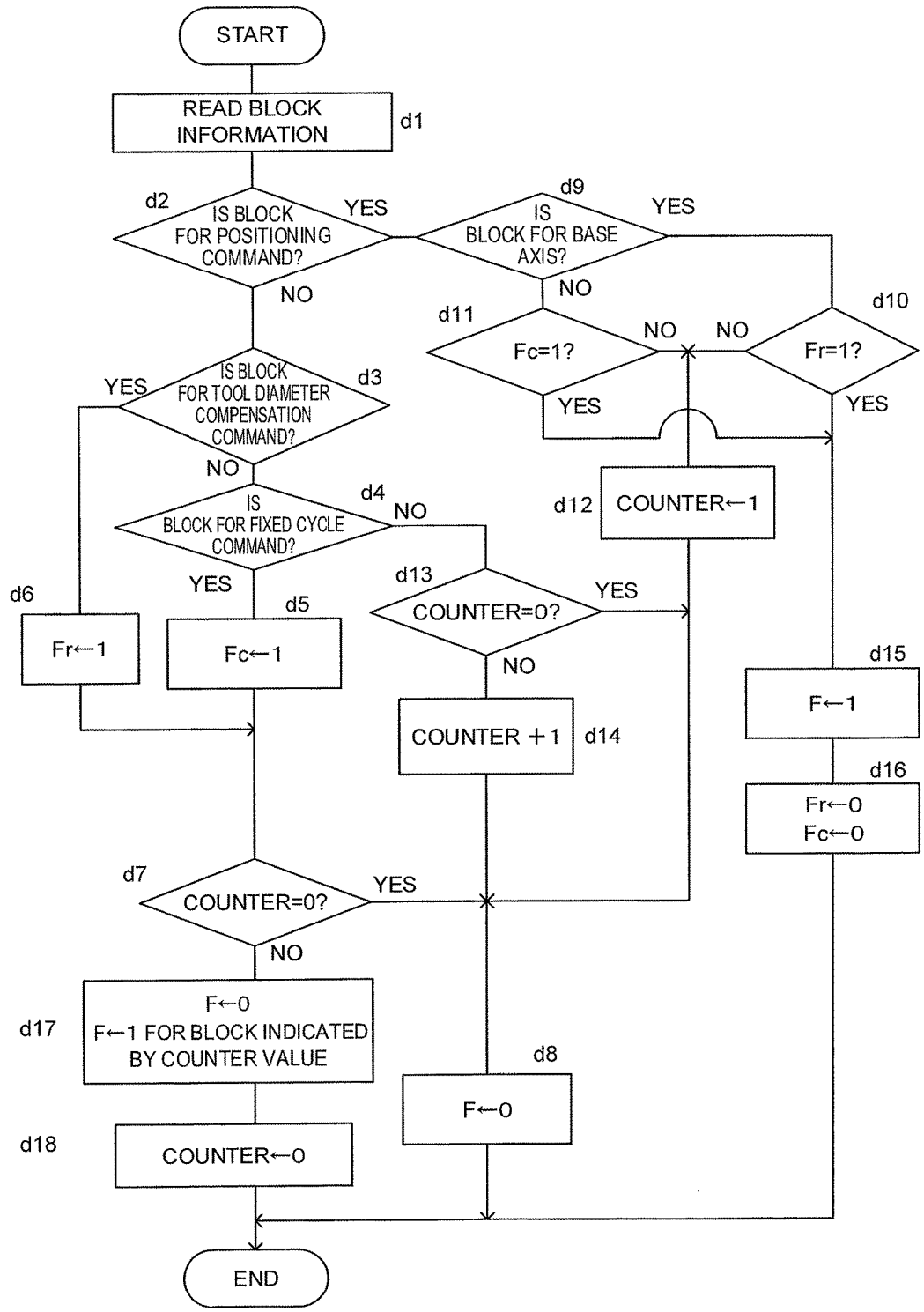
FIG. 8 is a flowchart illustrating an algorithm of a process in an embodiment of the present invention in which the retraction block is determined based on a combination of a positioning command, the tool diameter compensation command, or the composite fixed cycle command.

FIG. 8 is a flowchart of an algorithm of a retraction block determination process executed by the processor in the numerical controller 100 serving as the retraction block determination unit 16 when the retraction block condition setting unit 15 has input and set the determination method D for the retraction block. The processor executes processing illustrated in FIG. 8 each time one block is read from the machining program.

The processor reads block information resulting from decoding by the decoding unit 11 (step d1), and determines whether or not the current block is a block for the positioning command (step d2). If the current block is not a block for the positioning command, the processor determines whether or not the current block is a block for the tool diameter compensation command (step d3). If the current block is not a block for the tool diameter compensation command, the processor determines whether or not the current command is a block for the composite fixed cycle command (step d4). If the current block is also not a block for the composite fixed cycle command, the processor determines whether a value in a counter is "0" (step d13). Upon determining that the value in the counter is "0", the processor sets, to "0", the flag F that is indicative of the retraction block to be stored along with the executable format data of the current block (step d8) to end the processing. The processor subsequently executes the processing in steps d1, d2, d3, d4, d13, d8 each time one block is decoded unless a block for the positioning command, a block for the tool diameter compensation command, or a block for the composite fixed cycle command is loaded.

In step d3, upon determining that the read block is a block for the tool diameter compensation command, the processor sets a flag Fr indicating that a block for tool diameter compensation has been loaded, to "1" (step d6). In step d4, upon determining that the read block is a block for the composite fixed cycle command, the processor sets a flag Fc indicating that a block for the composite fixed cycle command has been loaded, to "1" (step d5). The flags Fr, Fc, and the counter are set to "0" during initialization for execution of the machining program.

The processor then determines whether or not the value in the counter is "0" (step d7), and if the value in the counter is "0", sets, to "0", the flag F that is indicative of the retraction block to be stored along with the executable format data of the current block (step d8) to end the processing.

On the other hand, upon determining, in the processing in step d2, that the read block corresponds to the positioning command, the processor determines whether or not an axis in the positioning command is the base axis (step d9). If the axis in the positioning command is the base axis, the processor determines whether or not the flag Fr indicating that a block for tool diameter compensation has been loaded is set to "1" (step d10). If the flag Fr is set to "1", the processor sets, to "1", the flag F that is indicative of the retraction block to be stored along with the executable format data of the current block (step d15) and resets the flags Fr, Fc to "0" (step d16) to end the processing.

On the other hand, upon determining that the positioning command is not directed to the base axis (step d9), the processor determines whether the flag Fc indicating that a block for the composite fixed cycle command has been loaded is set to "1" (step d11). If the flag Fc is set to "1", the processor sets, to "1", the flag F that is indicative of the retraction block to be stored along with the executable format data of the current block (step d15) and resets the flags Fr, Fc to "0" (step d16) to end the processing.

That is, if the positioning command is directed to the base axis, the processor designates the block for the positioning command as the retraction block and sets the flag F to "1" provided that the tool diameter compensation command block has been loaded, with the flag Fr set to "1". Even if the positioning command is not directed to the base axis, the processor designates the block for the positioning command as the retraction block and sets the flag F to "1" provided that the composite fixed cycle command has been loaded, with the flag Fc set to "1".

On the other hand, upon determining, in the processing in steps d10, d11, that the flags Fc, Fr are not set to "1" (when a block for the positioning command is loaded before a block for tool diameter compensation or a block for the composite fixed cycle command is loaded), the processor sets the value in the counter to "1" (step d12). The processor proceeds to step d8 to reset, to "0", the flag F that is indicative of the retraction block to be stored along with the executable format data of the current block to end the processing.

Once a block for the positioning command is loaded before a block for the tool diameter compensation command or the composite fixed cycle command is loaded and the value in the counter is set to "1", the processing in steps d1, d2, d3, d4, d13, d14, d8 is executed each time one block is decoded, with the value in the counter incremented by one (step d14), until a block for the tool diameter compensation command or the composite fixed cycle command is loaded. If a block for the positioning command is loaded again before a block for the tool diameter compensation command or the composite fixed cycle command is loaded, the processor executes the processing in steps d1, d2, d9, d10 or d11, d12, and the value in the counter is set to "1" as a result of the processing in step d12 even if the counter is performing a count-up operation.

Thus, the processor loads a block for the tool diameter compensation command or the composite fixed cycle command (after the processing in steps d3 to d6, the processor determines in step d7 whether or not the count value in the counter is "0", and if the counter value is not "0" (indicating that a block for the positioning command has already been loaded), sets, to "0", the flag F that is indicative of the retraction block to be stored along with the executable format data of that block, and traces back a number of blocks stored in the look-ahead register the number of which is indicated by the count value to read the data of a block resulting from the trace-back, and sets, to "1", the flag F that is indicative of the retraction block to be stored along with the executable format data of that block (the block for the positioning command)) (step d17). The processor sets the value in the counter to "0" (step d18) to end the processing. That is, when a block for the positioning command is loaded, and then, a block for the tool diameter compensation command or the composite fixed cycle command is loaded as in the program example 1 and the program example 3 described above, the processor sets, to "1", the flag F that is indicative of the retraction block to be stored along with the executable format data of the previously loaded block for the positioning command to designate the block for the positioning command as the retraction block.

In step d17, the processor sets, to "1", the flag F for the block (the block for the positioning command) resulting from tracing back a number of blocks in the look-ahead register the number of which is indicated by the count value. However, if no data is present in the block resulting from tracing back a number of blocks the number of which is indicated by the count value (the block has already been executed with the executable format data of the block removed), the flag F fails to be set to "1" and is neglected. That is, the retraction block is designated only when the tool diameter compensation command is issued early after the positioning command is issued. Even when, in step d17, the flag F is set to "1" to designate the retraction block, the flags Fr, Fc, indicating that the tool diameter compensation command and the composite fixed cycle command, respectively, have been loaded, remain set to "1" and are inhibited from being reset to "0". Thus, when a block for the next positioning command is loaded, the processing in steps d1, d2, d9, d10 or step d11, d15 is executed to set the flag F for the block for the positioning command to "1" to designate the block as the retraction block. Then, as described below (see processing illustrated in FIG. 9), the information of the block for which the flag F is set to "1" is saved in the retraction block information storage memory 19 such that the retraction block information storage memory 19 is overwritten with the information. Thus, the information of the most recently designated retraction block is stored in the retraction block information storage memory 19. That is, a block for the positioning command issued after the tool diameter compensation command is issued is preferentially designated as the retraction block.

The retraction block condition setting unit 15 selects and designates one of the methods A to D for determining the retraction block, and the retraction block determination unit 16 determines whether or not the loaded block is the retraction block. Since the flag F is set to "1" for the executable format data of the block determined to be the retraction block, the flag F=1 identifies the retraction block.

Figure 9:
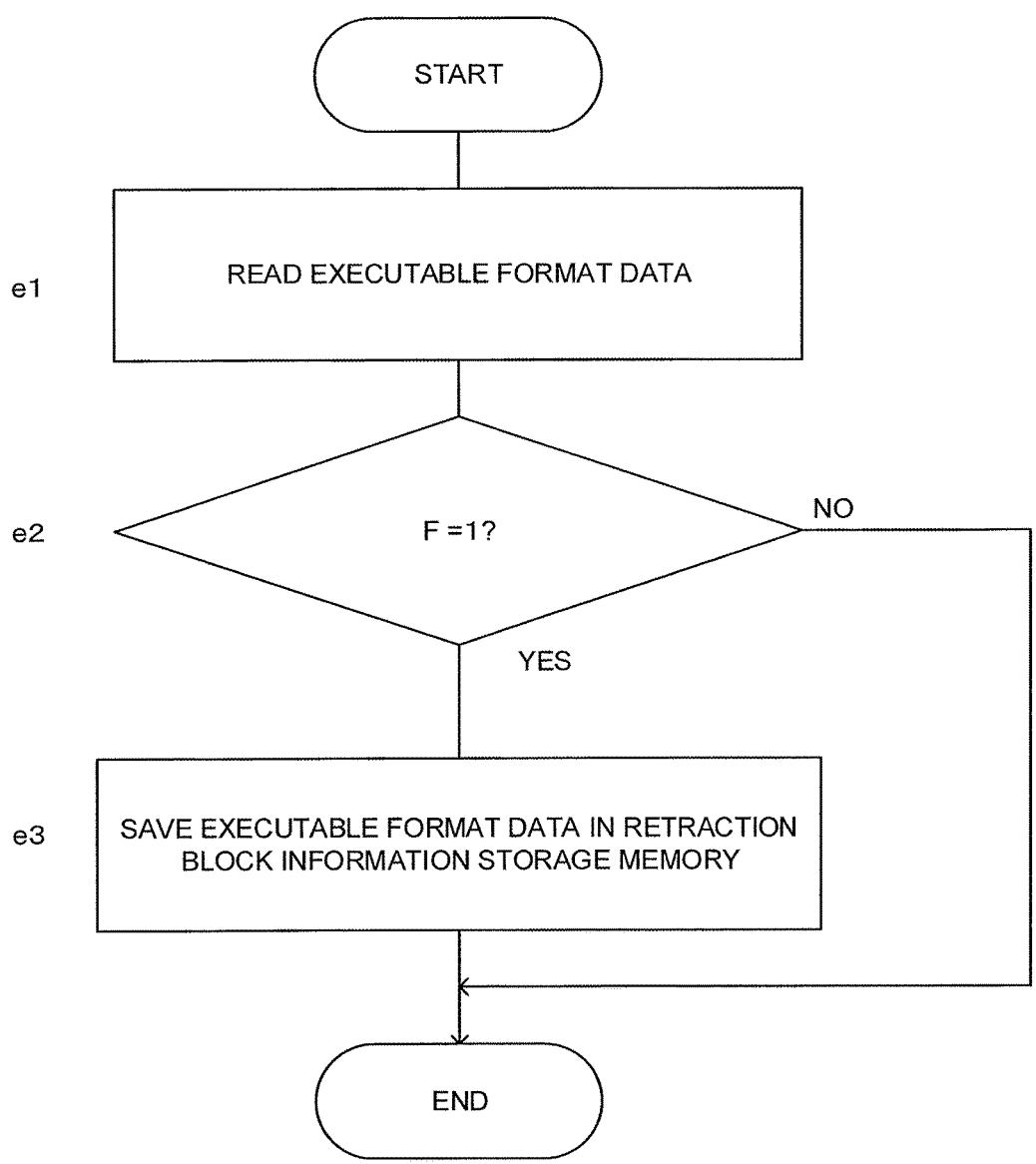
FIG. 9 is a flowchart illustrating an algorithm of a retraction block information reading process in an embodiment of the present invention.

FIG. 9 is a flowchart of an algorithm of a retraction block information reading process executed by the processor in the numerical controller 100 serving as the retraction block information reading unit 17. The processor executes the processing illustrated in FIG. 9 at a timing immediately before the start of pulse distribution.

The processor reads, from among information of the block (executable format data) stored in the look-ahead register, the first piece of information to be stored in first-in first-out manner (step e1) and determines whether the flag F in the piece of information is set to "1" (step e2). If the flag F is not set to "1", the processing is ended. On the other hand, if the flag F is set to "1", the block is designated as the retraction block. Thus, the processor stores the executable format data of the read block in the retraction block information storage memory 19 so as to overwrite the retraction block information storage memory 19 with the executable format data (step e3) to end the processing. The executable format data of the thus designated retraction block is stored in the retraction block information storage memory 19.

Figure 10:
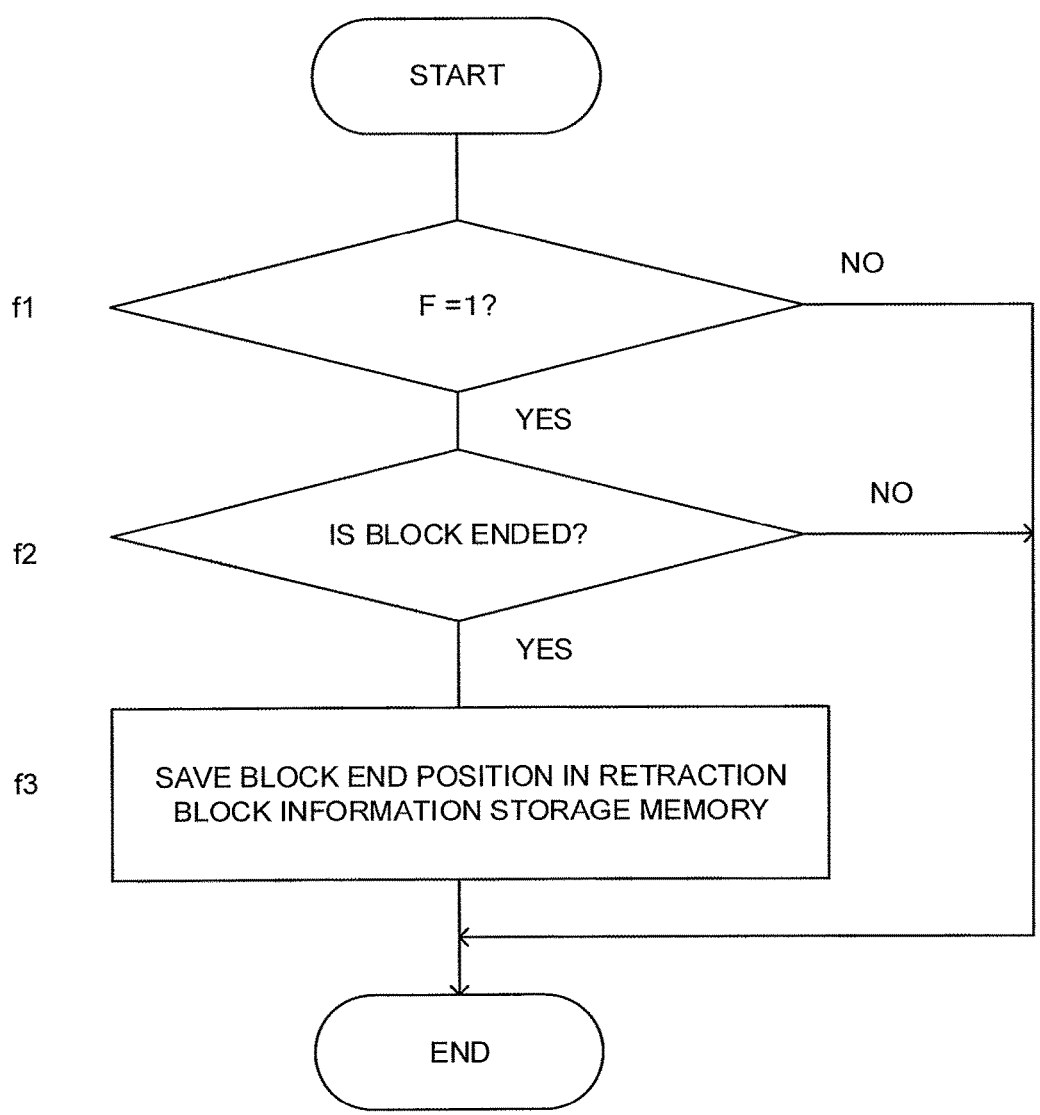
FIG. 10 is a flowchart illustrating an algorithm of a process for reading an end point coordinate position of the retraction block in an embodiment of the present invention.

FIG. 10 is a flowchart of an algorithm of a retraction block information reading process executed by the processor in the numerical controller 100 serving as the block end point position reading unit 18. The processor executes the processing illustrated in FIG. 10 during pulse distribution.

The processor determines whether or not the flag F is set to "1" for a block related to the ongoing pulse distribution (step f1). If the flag F is not set to "1", the processor ends the processing. If the flag F is set to "1", the processor determines whether or not the pulse distribution indicated in the command of the current block is ended with the end point of the block command reached (step f2). If the endpoint of the block command is not reached, the processor ends the processing. If the end point of the block command is reached, the processor stores the coordinate position updated by the coordinate update unit 14 in the retraction block information storage memory 19 along with the previously stored executable format data of the retraction block (step f3) to end the processing.

Thus, the retraction block information storage memory 19 stores the executable format data of the designated retraction block and the end point coordinate position for the corresponding block command.

Figure 11:
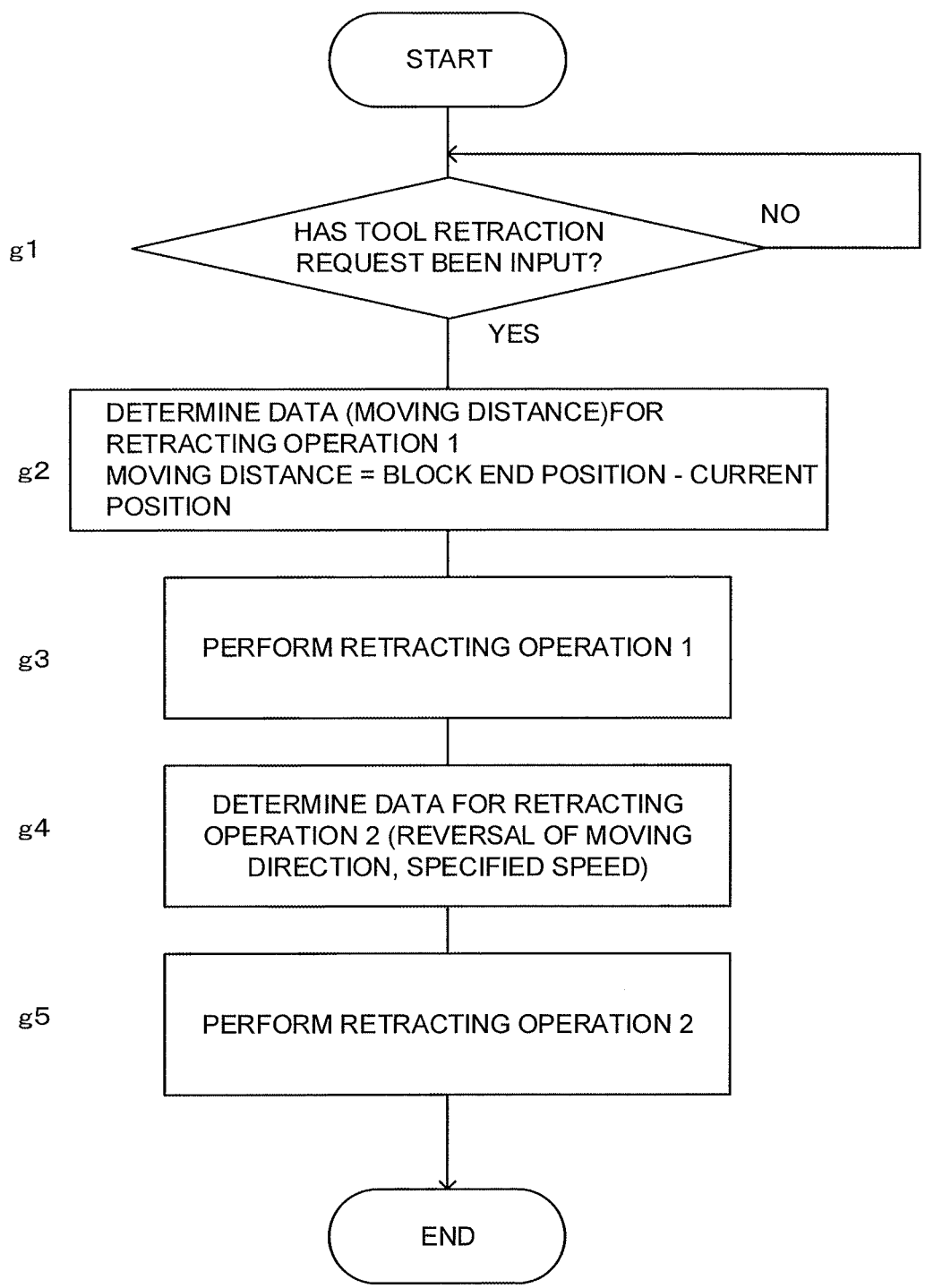
FIG. 11 is a flowchart illustrating an algorithm of a tool retracting process in an embodiment of the present invention.
Figure 12:
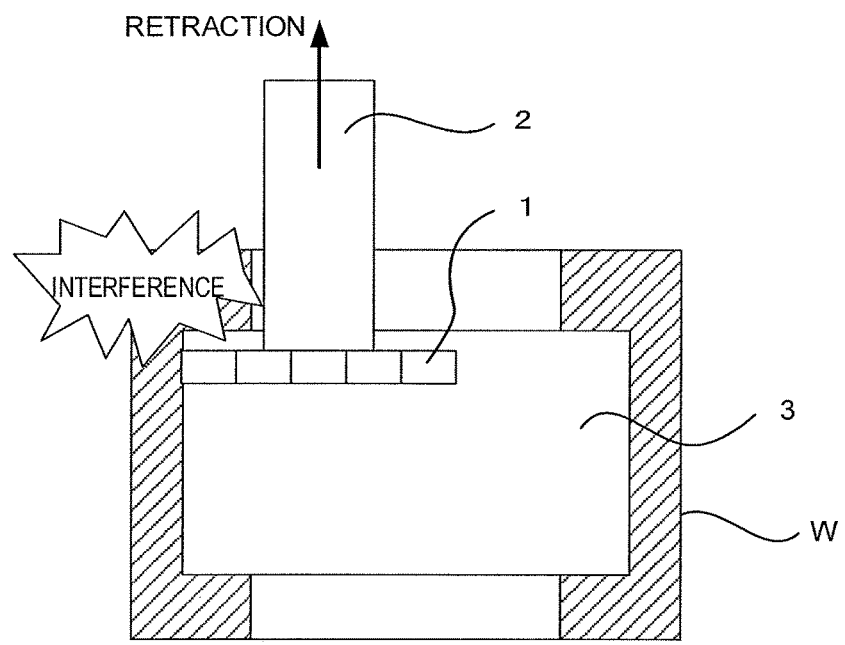
FIG. 12 is a diagram illustrating that a tool interferes with a workpiece when machining is interrupted and the tool is retracted.
Figure 13:
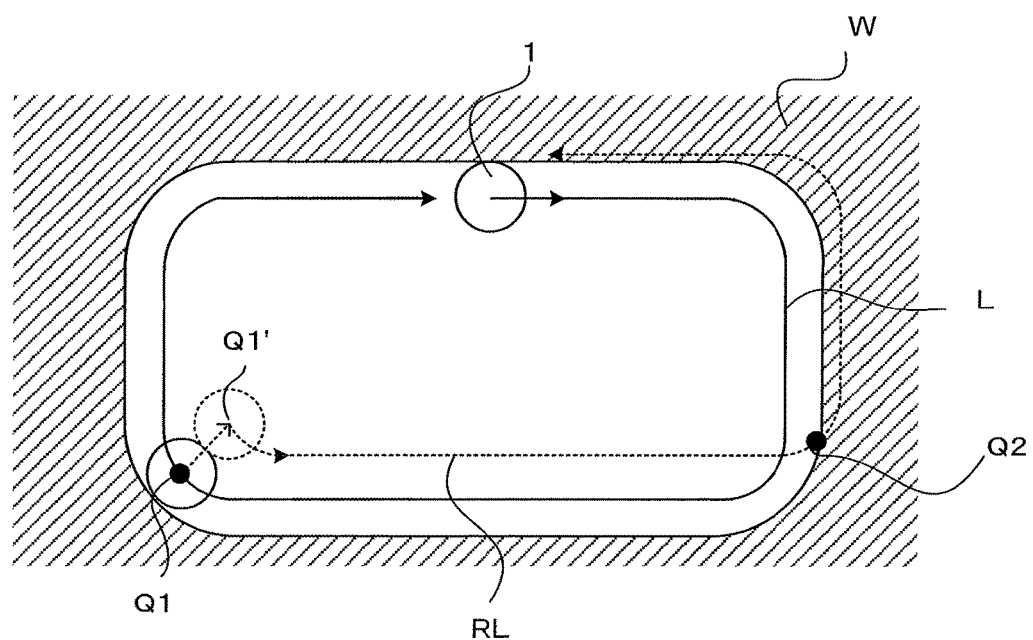
FIG. 13 is a diagram illustrating an example in which the tool interferes with the workpiece when the tool is shifted a predetermined amount and moved in a direction opposite to the direction of a machining path.

FIG. 11 is a flowchart of an algorithm of a tool retracting process executed by the processor in the numerical controller 100 serving as the tool retracting unit 20.

While the numerical controller 100 is executing the machining program so as to allow the machine tool to perform machining, if the machining is interrupted for any reason or cause, the processing illustrated in FIG. 11 is started. The processor checks to see if a tool retraction request has been input using the retraction command unit 21 including the operation panel, the soft keys, and MDI (step g1). When the tool retraction request is input, the processor determines, based on the coordinate position of an end point indicated in the retraction block stored in the retraction block information storage memory 19 and the current coordinate position read via the block end point position reading unit 18, data on a moving distance (the moving distance of each axis) from the current position to the end point coordinate position of the command of the retraction block. That is, the processor determines the moving distance of each axis for the "retracting operation 1" for movement from the current position to the end point coordinate position of the retraction block (step g2). The processor then allows execution of the "retracting operation 1" for movement over the determined moving distance at a preset retraction speed (step g3).

The processor then stores, in a temporary buffer, the executable format data of the retraction block to be stored in the retraction block information storage memory 19, and determines data for the "retracting operation 2" in which the path indicated in the retraction block is followed in the opposite direction (step g4). That is, the executable format data of the retraction block includes the moving distance of the axis, the moving direction, and the speed, and the moving direction is reversed and the speed is changed to a retraction speed that is preset in view of safety. Consequently, the data for the "retracting operation 2" is determined in which the path indicated in the retraction block is followed in the opposite direction. The processor then performs the determined "retracting operation 2" such that the pulse distribution unit 12 distributes pulses to move the tool in the opposite direction along the path indicated in the retraction block to retract the tool.

In the above-described embodiment, as shown in FIG. 1, when one retraction block is designated to retract the tool, the retracting operation is performed that includes the "retracting operation 1" for movement from the current coordinate position to the end point coordinate position of the retraction block and the "retracting operation 2" for movement in the opposite direction along the moving path indicated in the retraction block. However, when a plurality of retraction blocks may be set to allow for retraction, a retracting operation may be performed that starts at the current position and that involves the set plurality of retraction blocks. In this case, since a plurality of positioning blocks is set as the retraction blocks, the information (executable format data) of the retraction blocks is stored in the retraction block information storage memory without being overwritten. Endpoint coordinate positions resulting from execution of the retraction blocks are also stored along with the stored information (executable format data) of the retraction blocks. Then, when the tool retraction request is input, the processor reads, based on the current coordinate position, the executable format data of the retraction blocks and the end point coordinate positions stored in the retraction block information storage memory 19 in a reverse chronological order (in a last-in first-out manner) to allow the retracting operation to be performed.

For example, if information of a block B1, a block B2, and a block B3 is stored in the retraction block information storage memory in this order, when the tool retraction request is input, the following are performed based on the current coordinate position to retract the tool:

movement to an end point coordinate position of the block B3 (first retracting operation 1);

movement in the opposite direction along a path indicated in the block B3 (first retracting operation 2);

subsequent movement to an end point coordinate position of the block B2 (second retracting operation 1);

movement in the opposite direction along a path indicated in the block B2 (second retracting operation 2);

further movement to an end point coordinate position of the block B1 (third retracting operation 1)); and movement in the opposite direction along a path indicated in the block B1 (third retracting operation 2).

Furthermore, when a plurality of retraction blocks is set, a plurality of blocks may be set in the determination methods A, C for the retraction block. In the determination method B for the retraction block, one or more blocks that satisfy conditions are selected. If a plurality of retraction blocks is determined and set in the determination method D for the retraction block, then in the processing in FIG. 8, the processing in step d16 for resetting the flags Fr, Fc to "0" is omitted whereby the flags Fr, Fc remain set to "1" and each time a block for the positioning command is read, the block is designated as the retraction block.

In the above-described embodiment, the retracting operation 1 for movement from the position where machining is stopped to the end point coordinate position of the retraction block includes linear movement starting at the position where machining is stopped to the endpoint coordinate position of the retraction block. However, with the moving speed of each axis set to a corresponding specified speed (for example, a maximum speed), the moving path from the position where machining is stopped to the end point coordinate position of the retraction block may be zigzag. Furthermore, the order of the moving axes may be pre-specified so that each axis may be moved from the position where machining is stopped to the end point coordinate position of the retraction block.

The invention claimed is:

1. A numerical controller controlling a machine tool, the numerical controller comprising:
   a retraction block determination condition setting unit configured to set a condition for selecting as a retraction block a block in a machining program that moves a tool in an opposite direction along a command movement path when machining is suspended during machining operation and the tool is retracted;
   a determination unit configured to determine, when the machining is executed to perform the machining program, whether or not a decoded block in the machining program is the retraction block that satisfies the condition set by the retraction block determination condition setting unit;
   an executable format data reading unit configured to read executable format data resulting from decoding of the block determined to be the retraction block by the determination unit;
   an end point coordinate position reading unit configured to read an end point coordinate position indicated in the block determined to be the retraction block by the determination unit;
   a memory unit configured to store the read executable format data and the end point coordinate position; and
   a tool retracting unit configured to move, when a tool retraction command is input, the tool from a current tool position to the end point coordinate position of the retraction block stored in the memory unit, then to reverse a moving direction for the executable format data of the retraction block stored in the memory, and to execute the executable format data in order to retract the tool.

2. The numerical controller according to claim 1, wherein the memory unit is able to store the executable format data and the end point coordinate position for a plurality of retraction blocks,
   the tool retracting unit is configured to read retraction block information stored in the memory unit in a reverse order to an order of storage, to move the tool from a tool position assumed when the tool retraction command is input to the end point coordinate position of the read retraction block, and to reverse the moving direction for the executable format data of the retraction block to execute the executable format data, then to move the tool to the end point coordinate position for the read retraction block, and then to reverse the moving direction for the executable format data of the retraction block to repeat execution of the executable format data until the executable format data of the last read retraction block is executed with the moving direction for the executable format data reversed, thus retracting the tool.

3. The numerical controller according to claim 1, wherein the retraction block determination condition setting unit sets a sequence number or a line number of a block in the machining program to be selected as the retraction block, and
   the determination unit determines whether or not a block is the retraction block, based on the set sequence number or the line number in the machining program.

4. The numerical controller according to claim 1, wherein the retraction block determination condition setting unit sets, as selection conditions for the retraction block, a plurality of pieces of information that are included in information of each block of the machining program and that allow the block to be designated as the retraction block, and
   the determination unit determines whether or not the information of the decoded block satisfies all the set selection conditions thereby determining whether or not the block is the retraction block.

5. The numerical controller according to claim 4, wherein the selection conditions include at least a positioning command and an axis targeted by the positioning command and a moving distance thereof.

6. The numerical controller according to claim 1, wherein the retraction block is designated by, instead of using the retraction block determination condition setting unit, adding a predefined code to a block in the machining program, and
   the determination unit determines the block, to which the predefined code has been added, to be the retraction block.

7. The numerical controller according to claim 1, wherein the retraction block determination condition setting unit sets, as a condition for selection as the retraction block, a nearest block for the positioning command before a tool diameter compensation command, a block for the positioning command after the tool diameter compensation command, or a block for the positioning command immediately before a block with a machining mode switching code as represented by a composite fixed cycle command, and
   the determination unit determines whether or not a block is a retraction block by determining whether or not the information of the decoded block satisfies the condition set by the retraction block determination condition setting unit.

8. The numerical controller according to claim 1, wherein the determination unit includes a plurality of methods for determining and selecting a retraction block,
   the retraction block determination condition setting unit sets the method for determining and selecting a retraction block and determination conditions, and
   the determination unit determines whether or not a block is a retraction block, based on the method selected and set by the retraction block determination condition setting unit.

* * * * *